United States Patent [19]

Kuwahara

[11] Patent Number: 5,694,405
[45] Date of Patent: Dec. 2, 1997

[54] ENCODER AND DECODER OF AN ERROR CORRECTING CODE

[75] Inventor: Masanori Kuwahara, Kanagawa-ken, Japan

[73] Assignee: Kabushiki Kaisha Toshiba, Kanagawa-ken, Japan

[21] Appl. No.: 619,332

[22] Filed: Mar. 21, 1996

[30] Foreign Application Priority Data

Mar. 23, 1995 [JP] Japan ................. P07-064303

[51] Int. Cl.$^6$ ................................................. H03M 13/00
[52] U.S. Cl. ........................................ 371/37.1; 371/37.6
[58] Field of Search ........................... 371/37.1, 53, 37.6

[56] References Cited

U.S. PATENT DOCUMENTS

| | | | |
|---|---|---|---|
| 5,230,002 | 7/1993 | Yamashita et al. | 371/37.1 |
| 5,282,215 | 1/1994 | Hyodo et al. | 371/42 |
| 5,345,451 | 9/1994 | Uriu et al. | 371/42 |
| 5,383,203 | 1/1995 | Miyazono | 371/37.1 |
| 5,402,429 | 3/1995 | Stessens | 371/37.1 |
| 5,570,377 | 10/1996 | Merino Gonzalez et al. | 371/37.1 |

FOREIGN PATENT DOCUMENTS 4-363927  12/1992  Japan .

OTHER PUBLICATIONS de Prycker, "Asynchronous Transfer Mode Solution for Broadband ISDN", Chapter 3, Section 3.5, pp. 122–125, (1993).

ITU-T Recommendation I.432, "B-ISDN User-Network Interface-Physical Layer Specification", Chapter 4, pp. 157, 179–180, (1993).

Primary Examiner—Stephen M. Baker
Attorney, Agent, or Firm—Finnegan, Henderson, Farabow, Garrett & Dunner, L.L.P.

[57] ABSTRACT

An encoder and a decoder of an error correction code. A first division pattern generating circuit generates an n bit first division pattern used for dividing inputted n significant bit data in the next cycle from an n bit remainder obtained by dividing inputted data until then and inputted n less significant bit data. A second division pattern generating circuit generates an n bit second division pattern for dividing inputted n less significant bit data from the n bit remainder obtained by dividing inputted data until then. Therefore, the present invention provides the encoder and the decoder of a 2n parallel error correcting code which allows data to be coded and decoded, irregardless of whether the error correcting code is in the n more significant bits or the n less significant bits of a 2n parallel data bus.

52 Claims, 10 Drawing Sheets

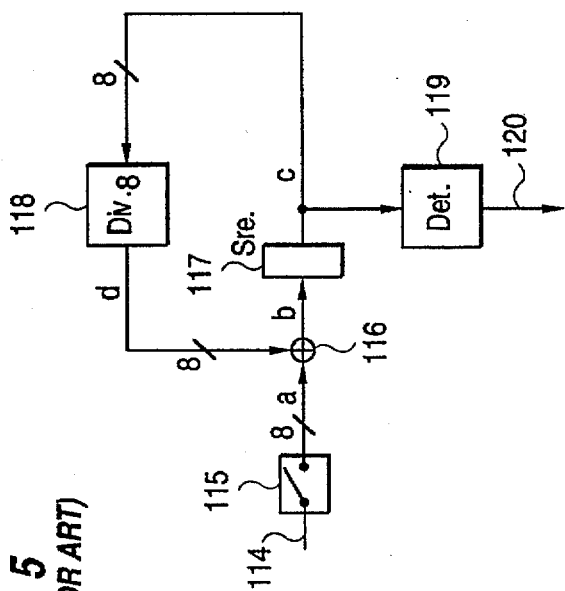
FIG. 5
(PRIOR ART)
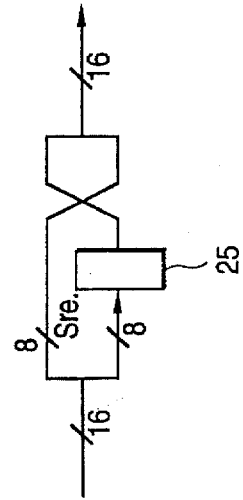
FIG. 13
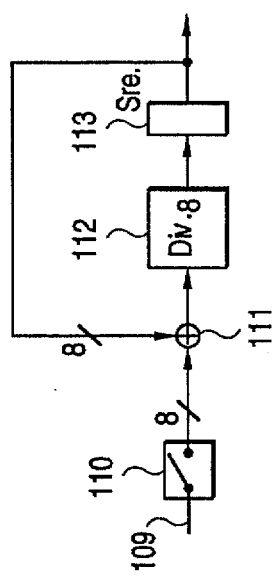
FIG. 3
(PRIOR ART)
FIG. 7

FIG. 6
*(PRIOR ART)*

| signal line cycle | a | b = a ⊕ d = ( INPUT DATA ) modG | c |
|---|---|---|---|
| 1 | H1 | (H1) modG | 0 (SHIFT REGISTER RESET) |
| 2 | H2 | (H1,H2) modG | (H1) modG |
| 3 | H3 | (H1,H2,H3) modG | (H1,H2) modG |
| 4 | H4 | (H1,H2,H3,H4) modG | (H1,H2,H3) modG |
| 5 | H5 | (H1,H2,H3,H4,H5) modG | (H1,H2,H3,H4) modG |
| 6 | 0 (INPUT OFF) | — | (H1,H2,H3,H4,H5) modG |

FIG. 8

| signal line cycle | aH | aL | b = aH ⊕ d = (INPUT DATA) modG | cH | cL |
|---|---|---|---|---|---|
| 1 | H1 | | (H1) modG | | 0 (SHIFT REGISTER RESET) |
| | H2 | | | | 0 (SHIFT REGISTER RESET) |
| | H3 | | (H1,H2,H3) modG | | (H1) modG |
| 2 | H4 | | | | H2 |
| | H5 | | (H1,H2,H3,H4,H5) modG | | (H1,H2,H3) modG |
| 3 | 0 (INPUT OFF) | | | | H4 |
| | 0 (INPUT OFF) | | — | | (H1,H2,H3,H4,H5) modG |
| 4 | 0 (INPUT OFF) | | | | 0 (SHIFT REGISTER RESET) |

FIG. 9

| signal line | $a_H$ | $a_L$ | $b = a_H \oplus d$ = (INPUT DATA) modG | $c_H$ | $c_L$ |
|---|---|---|---|---|---|
| cycle 1 | 0 (INPUT OFF) | H1 | 0 | 0 (SHIFT REGISTER RESET) | 0 (SHIFT REGISTER RESET) |
| | | | | | 0 (SHIFT REGISTER RESET) |
| 2 | H2 | H3 | (H1,H2) modG | 0 (SHIFT REGISTER RESET) | H1 |
| 3 | H4 | H5 | (H1,H2,H3,H4) modG | (H1,H2) modG | H3 |
| 4 | P1 | P2 | (H1,H2,H3,H4,H5,P1) modG | (H1,H2,H3,H4) modG | H5 |
| 5 | P3 | P4 | — | — | (H1,H2,H3,H4,H5,P1) modG |

FIG. 11

| signal line | $a_H$ | $a_L$ | $b = a_H \oplus d$ = (INPUT DATA) modG | $c_H$ | $c_L$ |
|---|---|---|---|---|---|
| cycle 1 | 0 (INPUT OFF) | | 0 | | 0 (SHIFT REGISTER RESET) |
| | | H1 | | | 0 (SHIFT REGISTER RESET) |
| 2 | | H2 | (H1,H2) modG | | 0 (SHIFT REGISTER RESET) |
| | | H3 | | | H1 |
| 3 | | H4 | (H1,H2,H3,H4) modG | | (H1,H2) modG |
| | | H5 | | | H3 |

| signal line | $a_H$ | $a_L$ | $f = c_L \oplus e$ = (INPUT DATA) modG | $c_H$ | $c_L$ |
|---|---|---|---|---|---|
| cycle 4 | 0 (INPUT OFF) | | (H1,H2,H3,H4,H5) modG | | (H1,H2,H3,H4) modG |
| | 0 (INPUT OFF) | | | | H5 |

ENCODER AND DECODER OF AN ERROR CORRECTING CODE

FIELD OF THE INVENTION

This invention relates to an encoder for adding an error correcting code to transmittal data and a decoder for detecting the error correcting code. The error correcting code allows detection and correction of an error in original communication data at a transmission side. This invention also relates to in parallel coding and decoding.

BACKGROUND OF THE INVENTION

An error correcting code enables the receiving side to detect and correct an error in data transmitted from the transmission side on a communication path. In communications using such an error correcting code, data is coded by adding the error correcting code to the original data on the transmission side. The receiving side obtains the original data by decoding the received coded data.

When an error has been generated in the coded data on the communication path, the code allows the receiving side to detect the error and to correct the error so long as it is within a correctable range. ATM (Asynchronous Transfer Mode) communication uses such an error correcting code. ATM communication is described, for example, in "ASYNCHRONOUS TRANSFER MODE Solution for Broadband ISDN" published by Ellis Horwood Limited in the United Kingdom, 1993.

In ATM communication, data is transferred in units of ATM cells (hereinafter referred to simply as a cell) comprised of 53 bytes. Each cell has a 5 byte header portion and a 48 byte portion for user data payload. Important data such as an address indicating a destination to which the cell is to be transmitted and other management data is written in the header, and it is desirable to detect and correct an error in this header portion. For error detection and correction, the header is arranged to generate an error correcting code. That is, the header is coded by adding one byte of data called the HEC byte (or simply HEC) to the fifth byte of the header as data which gives a redundancy to the header.

The principle for coding and decoding the header in ATM communication will be explained below.

First, a coding operation is performed on the transmission side. The 5 byte header (however, the fifth byte to which the HEC is added is (00000000)) is divided by a generator polynomial $G(X)=X^8+X^2+X+1$ (=(100000111)), and a remainder thereof (8 bits in maximum) is added to the fifth byte as the HEC. By adding the HEC, the entire 5 byte header can be divided perfectly by the generator polynomial $G(X)$.

The operation of generating an HEC will be referred to as "HEC generation" hereinafter. Although the HEC byte is commonly defined as the 8 bit pattern added to the remainder in the actual ATM communication to get the remainder (01010101), here, to simplify the explanation, the HEC byte is defined as the pattern added to the header to get the remainder (00000000).

Meanwhile, on the receiving side, the received data is divided by the same generator polynomial $G(X)$ as on the transmission. When the received data can be divided perfectly (with no remainder), the header has been detected correctly. When the received data cannot be divided perfectly (the remainder is not all zeros), an error has occurred, and processing such as error correction or discarding of the cell is carried out as necessary. Such decoding operation will be referred to as "HEC check" hereinafter.

An arrangement for realizing such processing will now be explained.

First, a circuit for performing the HEC generation, i.e. a HEC generating circuit, will be explained.

As is apparent from the above explanation, HEC generation is performed using a division circuit. FIG. 1 shows a structure of the division circuit in which $X^8D(X)$ obtained by multiplying input data $D(X)$ with $X^8$ is divided by a generator polynomial $G(X)=X^8+X^2+X+1$.

In FIG. 1, when the first four bytes of the header are input in series to an input line 101, a switch 102 is turned ON. While each bit of the data input is transferred sequentially to flip-flops F1 through F8, via the switch 102, an exclusive OR of the data input via the switch 102 and the data stored in the flip flop F8 is taken at an exclusive OR gate 103a; an exclusive OR of the result of this logical operation and the data stored in the flip flop F1 is taken at an exclusive OR gate 103b; and the exclusive OR of the result of the logical operation in the exclusive OR gate 103a and the data stored in the flip-flop F2 is taken at an exclusive OR gate 103c.

When the first four bytes of the header have been thus input, a remainder which is given when the data multiplied by $X^8$ is divided by $G(X)$ is stored in eight flip-flops F1 through F8. The flip-flop F8 corresponds to the most significant bit (MSB). The HEC byte can be obtained by outputting the remainders stored in the flip-flops F1 through F8 sequentially from a signal line 104.

Next, a circuit for performing the HEC check, i.e. a HEC checking circuit, will be explained.

FIG. 2 shows a structure of a division circuit in which the input data $D(X)$ is divided by the generator polynomial $G(X)=X^8+X^2+X+1$.

In FIG. 2, when the five bytes of the header are input to an input line 105, a switch 106 is turned ON. While each bit of the data input via the switch 106 is transferred sequentially to flip-flops F1 through F8, an exclusive OR of the data input via the switch 106 and the data stored in the flip-flop F8 is taken at an exclusive OR gate 107a; an exclusive OR of the data stored in the flip-flop F1 and the data stored in the flip-flop F8 is taken at an exclusive OR gate 107b; and an exclusive OR of the data stored in the flip-flop F2 and the data stored in the flip-flop F8 is taken at an exclusive OR gate 107c.

When the five byte header has been thus input, a remainder which is given when the five bytes of data in the header is divided by $G(X)$ is stored in the eight flip-flops F1 through F8. Then, it becomes possible to determine whether an error exists or not by checking whether the remainder (so-called syndromes) outputted sequentially from a signal line 108 is (00000000) or not. It is also possible to correct a one bit error in the header by checking the syndrome pattern, when the syndrome pattern is not (00000000).

A parallel circuit, rather than the serial circuit, is used for high transfer rate communications. The circuit elements of the serial circuit are too slow to process data transmitted/received at high transfer rates in serial. Accordingly, an 8 bit parallel circuit as disclosed, for example, in Japanese Patent Laid Open (Ko-kai) 92-363927, is actually used. The 8 bit parallel circuit divides 8 bits in one cycle (in contrast to eight cycles in the serial circuit) and accommodates a high transfer rate even if the operation speed of the individual devices is slow.

The 8 bit parallel HEC generating circuit and the 8 bit parallel HEC checking circuit will now be explained.

FIG. 3 shows a circuit obtained by 8 bit paralleling the serial HEC generating circuit shown in FIG. 1.

In FIG. 3, the HEC generating circuit comprises a switch 110 which receives data supplied via an input line 109, an exclusive OR gate 111, a division pattern generating circuit 112 with an 8 bit parallel input, and an 8 bit parallel one step shift register 113. The division pattern generating circuit 112 with an 8 bit parallel input is constructed by exclusive OR gates as shown in FIG. 4. Input bit lines of the division pattern generating circuit 112 are assumed to be I[i] (i=0 to 7, i=7 corresponds to MSB) and output bit lines to be O[i] (i=0 to 7, i=7 corresponds to MSB). The division pattern generating circuit 112 thus generates a division pattern according to the follow logic expression:

$$O[7]=I[7] \text{ EXOR } I[6] \text{ EXOR } I[5],$$

$$O[6]=I[6] \text{ EXOR } I[5] \text{ EXOR } I[4],$$

$$O[5]=I[5] \text{ EXOR } I[4] \text{ EXOR } I[3],$$

$$O[4]=I[4] \text{ EXOR } I[3] \text{ EXOR } I[2],$$

$$O[3]=I[7] \text{ EXOR } I[3] \text{ EXOR } I[2] \text{ EXOR } I[1],$$

$$O[2]=I[6] \text{ EXOR } I[2] \text{ EXOR } I[1] \text{ EXOR } I[0],$$

$$O[1]=I[6] \text{ EXOR } I[1] \text{ EXOR } I[0],$$

$$O[0]=I[7] \text{ EXOR } I[6] \text{ EXOR } I[0]. \quad (1)$$

"EXOR" represents the arithmetic operations of exclusive OR. The function of Expression (1) is realized by the circuit shown in FIG. 4, for example. That is, the division pattern generating circuit 112 outputs an 8 bit division pattern constructed by the Expression (1) each cycle. The division pattern corresponds to a remainder given when the input data is multiplied by $X^8$ and divided by G(X). The circuit constructed as described above will be referred to as "an 8 bit HEC generating circuit" hereinafter.

In the circuit of FIG. 3, the switch 110 is turned ON when the data of the header from the first byte to the fourth byte is input to the signal line 109. When the fourth byte of data has been input, a remainder, i.e. the HEC byte, is calculated by dividing the first four bytes of the header multiplied by $X^8$ by the generator polynomial $G(X)=X^8+X^2+X+1$. The remainder is output from the shift register 113 in the next or fifth cycle.

FIG. 5 shows a circuit obtained by 8 bit paralleling the serial HEC checking circuit shown in FIG. 2.

In FIG. 5, the circuit comprises a switch 115 which receives data supplied via an input line 114, an exclusive OR gate 116, an 8 bit parallel one step shift register 117, a division pattern generating circuit 118 with an 8 bit parallel input, and a header detecting circuit 119. The header detecting circuit 119 outputs a high level signal from a signal line 120 when a remainder output from the shift register 117 is (00000000) to signal that the header has been received without error. The output of the division pattern generating circuit 118 with an the 8 bit parallel input is given by the Expression (1) described above. That is, the division pattern generating circuit 118 outputs an 8 bit division pattern constructed by the Expression (1) each cycle. The division pattern is used for generating a remainder given when the input data is divided by G(X) by adding the latest input data at the exclusive OR gate 116. The circuit constructed as described above will be referred to as "an 8 bit HEC checking circuit" hereinafter.

This circuit operates as follows. The switch 115 is turned ON when the data from the first byte to the fifth byte of the header is input to a signal line a. When the fifth byte has been input, a remainder (syndrome) given when the five byte data of the header is divided by the generator polynomial G(X) $=X^8+X^2+X+1$ is output to a signal line c in the next cycle. When there is no error in the header, the remainder is (00000000), and the header detecting circuit 119 outputs a high level signal to the signal line 120, thus informing that the header has been received without error. On the other hand, when there is an error in the header, the remainder takes a value other than (00000000), and the header detecting circuit 119 outputs a low level signal to the signal line 120, informing that an error has occurred in the header.

Next, the division process of the 8 bit HEC checking circuit will be explained with reference to FIG. 6.

FIG. 6 is a table showing changes of data on each of the signal lines a, b and c of the 8 bit HEC checking circuit shown in FIG. 5 per cycle. The signal lines a, b, c and d in FIG. 6 correspond to the signal lines denoted by the same reference characters described in FIG. 5. H1, H2, . . . described in the fields of the signal line a indicate that the first byte, second byte, . . . of the header are input in the signal line a respectively in each cycle. (H1, H2)modG, for example, described in the field of the signal line b indicates that a remainder, given when 2 bytes (H1, H2) are divided by the generator polynomial G(X), is output in the signal line b when the second byte of the header has been input on the signal line a. The data output on the signal line b is stored and delayed by one cycle at the one step, 8-bit parallel shift register 117. The register 117 outputs the data on the signal line c.

It can be seen in FIG. 6 that each cycle when one byte of the header is input, a remainder, given when the data that has been input till then is divided by G(X), is output on the signal line b, and the remainder is output on the signal line c one cycle later. Accordingly, in the sixth cycle since initially entering the header, the header detecting circuit 119 will detect no error in the header if the header is received without error.

The header is coded and decoded in 8 bits parallel in ATM communication as described above. As described before, the circuit structure is paralleled to compensate for the relatively slow operation speed of devices currently available. However, because an even faster transfer rate may be put into a practical use in the near future, the inventor has contemplated extending the circuit structure from the current 8 bits parallel to 16 bits parallel.

A 16 bit parallel HEC checking circuit obtained by extending the 8 bit circuit will be discussed below. To that end, the HEC generating circuit will not be mentioned for a while and only the HEC checking circuit will be discussed below.

FIG. 7 shows a structure of the 16 bit parallel HEC checking circuit (this circuit will be referred to as a 16 bit HEC checking circuit hereinafter).

In FIG. 7, signal lines $a_H$ and $a_L$ correspond to 8 more significant bits and 8 less significant bits on a 16 bit data input bus, respectively. A switch 121 separately turns inputs to the signal lines $a_H$ and $a_L$ ON and OFF. An exclusive OR of the data on the signal line $a_H$ and data on the signal line d is taken at an exclusive OR gate 122, is input to flip-flops of 8 more significant bits of a 16 bit parallel, one step shift register 123 via the signal line b, and is then output to the signal line $c_H$. The data on the signal line $a_L$ is input to 8 less significant bits of the shift register 123 and is then output on the signal line $c_L$.

A division pattern generating circuit 124 in the case of 16 bit parallel input has a 16 bit input and an 8 bit division pattern output. While the input of the generating circuit 124 is 16 bits, the output thereof is 8 bits because a remainder given by the division with a 9 digit generator polynomial G(X) is 8 digits maximum. When input bit lines are assumed to be I[i] (i=0 to 15, i=15 corresponds to MSB), a relation between input I[i] and output O[i] is given by the following expression:

O[7]=I[15] EXOR I[13] EXOR I[11] EXOR I[7] EXOR I[6] EXOR I[5],

O[6]=I[14] EXOR I[12] EXOR I[10] EXOR I[6] EXOR I[5] EXOR I[4],

O[5]=I[15] EXOR I[13] EXOR I[11] EXOR I[9] EXOR I[5] EXOR I[4] EXOR I[3],

O[4]=I[15] EXOR I[14] EXOR I[12] EXOR I[10] EXOR I[8] EXOR I[4] EXOR I[3] EXOR I[2],

O[3]=I[14] EXOR I[13] EXOR I[11] EXOR I[9] EXOR I[7] EXOR I[3] EXOR I[2] EXOR I[1],

O[2]=I[15] EXOR I[13] EXOR I[12] EXOR I[10] EXOR I[8] EXOR I[6] EXOR I[2] EXOR I[1] EXOR I[0],

O[1]=I[15] EXOR I[14] EXOR I[13] EXOR I[12] EXOR I[9] EXOR I[6] EXOR I[1] EXOR I[0],

O[0]=I[14] EXOR I[12] EXOR I[8] EXOR I[7] EXOR I[6] EXOR I[0].         (2)

A header detecting circuit 125 is the same as that shown in FIG. 5.

An operation of the 16 bit HEC checking circuit shown in FIG. 7 will be explained below.

Because a width of the data input bus is expanded from 8 bits to 16 bits here, there arises a matter to be taken into account in considering the operation. That is, while 2 bytes of data are transferred per cycle in the 16 bit parallel data bus, the head of the cell (first byte of the header) appears alternately in the 8 more significant bits and the 8 less significant bits on the 16 bit data bus, because one cell has 53 bytes, an odd number of bytes. Accordingly, it is necessary to consider the operation of the 16 bit HEC checking circuit for each of those two cases.

The operation of the HEC checking circuit when the first byte of the header exists in the 8 more significant bits of the data input bus will be explained with reference to FIG. 8.

FIG. 8 is a table showing changes of data on each signal line of the 16 bit HEC checking circuit per cycle.

In the figure, the first byte (H1) of the header is input to the signal line $a_H$ and the second byte (H2) of the header is input to the signal line $a_L$ at the same time in the first cycle. At this time, a remainder (H1)modG (first byte itself of the header) given when the first byte of the header is divided by G(X) is output to the signal line b and stored in the 8 more significant bits of the shift register 123. Thereafter, a remainder of division in each cycle is output to the signal line b and stored in the 8 more significant bits of the shift register 123, and then in the next cycle, the stored remainder is output to the signal line $c_H$. In the second cycle, the third byte (H3) and the fourth byte (H4) of the header are input and a remainder (H1, H2, H3)modG given when the input until the third byte is divided by G(X) is output to the signal line b and stored in the 8 bits significant more of the shift register 123.

In the third cycle, the fifth byte (H5) of the header is input to the signal line $a_H$ and an input of the signal line $a_L$ is turned OFF. At this time, a remainder (H1, H2, H3, H4, H5)modG given when the input until the fifth byte is divided by G(X) is output to the signal line b. This remainder is (00000000), if no error has occurred in the header. When the remainder (00000000) is output in the signal line $c_H$ in the fourth cycle, the header detecting circuit 125 sends out a signal indicating that the header has been received without error.

The remainders output to the signal line $c_H$ by the operation described above may be arranged as follows:

(H1)modG, (H1, H2, H3)modG, (H1, H2, H3, H4, H5)modG. These reminders correspond to those output in the signal line c shown in FIG. 5 in the second, fourth, and sixth cycles, respectively, in the operation shown in FIG. 6 of the 8 bit HEC checking circuit. Then, the remainders (H1, H2)modG and (H1, H2, H3, H4)modG which have been output in the signal line c in the third and fifth cycles, respectively, in the 8 bit HEC checking circuit are never output in the operation of the 16 bit HEC checking circuit. It is because the data processing is carried out 2 bytes at a time in the 16 bit parallel circuit.

Next, an operation of the HEC checking circuit when the first byte of the header exists in the 8 less significant bits of the data input bus will be explained with reference to FIG. 9.

In the figure, the input of the signal line $a_H$ is turned OFF and the first byte (H1) of the header is input to the signal line $a_L$ in the first cycle. At this time, no division is performed and only (00000000) output from the signal line b and the first byte of the header are input to the shift register 123. In the second cycle, the second byte (H2) of the header is input to the signal line $a_H$ and the third byte (H3) of the header is input to the signal line $a_L$ at the same time. At this time, a remainder (H1, H2)modG given when the input before the second byte of the header is divided by G(X) is output to the signal line b and stored in the 8 more significant bits of the shift register 123.

In the third cycle, the fourth byte (H4) and the fifth byte (H5) of the header are input and a remainder (H1, H2, H3, H4)modG given when the input before the fourth byte is divided by G(X) is output to the signal line b and stored in the 8 more significant bits of the shift register 123. In the fourth cycle, the first byte (P1) and the second byte (P2) of the payload are input, and at this time a remainder (H1, H2, H3, H4, H5, P1)modG given when the input before the sixth byte (P1) from the head of the cell is divided by G(X) is output to the signal line b. The remainders output in the signal line $c_H$ by the operation described above may be arranged as follows:

(H1, H2)modG, (H1, H2, H3, H4)modG, (H1, H2, H3, H4, H5, P1)modG.

In this case, the remainders (H1)modG, (H1, H2, H3)modG and (H1, H2, H3, H4, H5)modG have been output in the signal line c in the second, fourth and sixth cycles, respectively, in the operation (see FIG. 6) of the 8 bit HEC checking circuit. Those remainders, however, are never output to the signal line b. The remainder (H1, H2, H3, H4, H5)modG which represents the result of the HEC check cannot be obtained. The remainder obtained is (H1, H2, H3, H4, H5, 00000000)modG, and is not (H1, H2, H3, H4 H5)modG, even when the inputs to the signal line $a_H$ and the signal line $a_L$ are zeroed on and after the fourth cycle in the operation shown in FIG. 9.

When the 16 bit HEC checking circuit shown in FIG. 7, which is an extension of the 8 bit checking circuit, is used, the HEC check cannot be performed when the first byte of the header exists in the 8 less significant bits of the data input bus as indicated by the operation shown in FIG. 9. The HEC check is only performed in every other cell.

This problem may occur not only in ATM communication but also with respect to more general communication systems. That is, the same problem with that in the case of the ATM communication described above may occur when the first byte of a train of coded data in which data in byte units is put together is output to either of the 8 more significant bits or the 8 less significant bits of the 16 bit parallel data bus.

Further, the above-mentioned problem related to the 16 bit HEC checking circuit may also occur when the HEC generating circuit is 16 bits parallel.

SUMMARY OF THE INVENTION

Accordingly, it is an object of the present invention to solve the aforementioned problem by providing an encoder and a decoder of a 2n parallel error correcting code which allows data to be coded and decoded, irregardless of whether the error correcting code is in the n more significant bits or the n less significant bits of a 2n parallel data bus.

In accordance with the present invention, the foregoing object, among others, are achieved by providing a decoder for decoding communication data which is coded with an n bit error correcting code, comprising a data input bus for inputting received communication data by 2n bits parallel in each cycle, a first switch circuit for passing inputted n bit data which are n significant bits of the 2n bit data from the data input bus when the n significant bits data of the 2n bits data from the data input bus are the coded communication data, a second switch circuit for passing inputted n bit data which are n less significant bits of the 2n bit data from the data input bus when the n less significant bit data of the 2n bit data from the data input bus are the coded communication data, a first gate circuit for taking an exclusive OR with respect to the n bit data from the first switch circuit and an n bit first division pattern, a first shift register for storing the n bit data from the first gate circuit as n significant bit data and the n bit data from the second switch circuit as n less significant bit data and for outputting the stored 2n bit data in the next cycle, a first division pattern generating circuit for generating the n bit first division pattern from the 2n bit data from the first shift register, a second division pattern generating circuit for generating an n bit second division pattern from the n significant bit data of the 2n bit data from the first shift register, a second gate circuit for taking an exclusive OR with respect to the n less significant bit data of the 2n bit data from the first shift register and the n bit second division pattern, a first detecting circuit for detecting that the n significant bit data of the 2n bit data from the first shift register are equal to prescribed data which means that there is no error in the coded data which is received, and a second detecting circuit for detecting that the n bit data from the second gate circuit are equal to the prescribed data which means that there is no error in the coded data which is received.

In accordance with another aspect of the present invention, the above-stated objects are achieved by providing the decoder further comprising a first selector for selecting alternatively n significant bits of the 2n bit data from the first shift register or the n bit data from the second gate circuit, an error correcting pattern generating circuit for generating a 2n bit error correcting pattern from the n bit data from the first selector, a delay circuit for storing n less significant bit data of the 2n bit error correcting pattern from the error correcting pattern generating circuit and for outputting the stored n bit data as n significant bit data with inputted n significant bit data of the 2n bit error correcting pattern from the error correcting pattern generating circuit as n less significant bit data in the next cycle, a second selector for selecting alternatively the 2n bit error correcting pattern from the error correcting pattern generating circuit or the delayed 2n bit error correcting pattern from the delay circuit, a second shift register for storing 2n bit data from the data input bus and for outputting the stored 2n bit data, and a third gate circuit for taking an exclusive OR with respect to the 2n bit data from the second shift register and the 2n bit error correcting pattern from the second selector and for outputting error corrected header data.

In accordance with the present invention, the foregoing object, among others, are achieved by providing an encoder for encoding communication data with an n bit error correcting code, comprising a data input bus for inputting the header of the communication data by 2n bits parallel in each cycle, a first switch circuit for passing inputted n bit data which in the n more significant bits of the 2n bit data from the data input bus when the n more significant bit data of the 2n bit data from the data input bus are the data which is to be coded, a second switch circuit for passing inputted n bit data which are n less significant bit of the 2n bit data from the data input bus when the n less significant bits data of the 2n bit data from the data input bus are the data which is to be coded, a first gate circuit for taking an exclusive OR with respect to the n bits data from the first switch circuit and an n bit first division pattern, a first division pattern generating circuit for generating the n bit first division pattern from the n bit data from the first gate circuit and the n bit data from the second switch circuit, a shift register for storing the n bit data from the first division pattern generating circuit and for outputting the stored n bit data in next cycle, a second division pattern generating circuit for generating an bit second division pattern from n bit data from the first gate circuit, and a selector for selecting alternatively the n bit data from the shift register or the n bit data from the second division data generating circuit as the error correcting code.

In accordance with another aspect of the present invention, the above-stated objects are achieved by providing an encoder for encoding communication data with an n bit error correcting code, comprising a data input bus for inputting the header of the communication data by 2n bits parallel in each cycle, a first switch circuit for passing inputted n bit data which is the n more significant bits of the 2n bit data from the data input bus when the n significant bit data of the 2n bit data from the data input bus is the data which is to be coded, a second switch circuit for passing inputted n bit data which is the n less significant bits of the 2n bit data from the data input bus when the n less significant bit data of the 2n bit data from the data input bus are the data which is to be coded, a first gate circuit for taking an exclusive OR with respect to the n bit data from the first switch circuit and an n bit first division pattern, a shift register for storing the n bit data from the first gate circuit as n more significant bit data and the n bit data from the second switch circuit as n less significant bit data and for outputting the stored 2n bit data in the next cycle, a first division pattern generating circuit for generating the n bit first division pattern from the 2n bit data from the first shift register, a second division pattern generating circuit for generating an n bit second division pattern from n significant bit data of the 2n bits data from the shift register, a second gate circuit for taking an exclusive OR with respect to the n less significant bit data of the 2n bit data from the shift register and the n bit second division pattern, and a selector for selecting alternatively the n significant bits of the 2n bit data from the shift register or the n bit data from the second gate circuit as the error correcting code.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

A more complete appreciation of the present invention and many of its attendant advantages will be readily obtained by reference to the following detailed description considered in connection with the accompanying drawings, in which:

FIG. 3 is a diagram showing a structure of an 8 bit parallel HEC generating circuit;

FIG. 5 is a diagram showing a structure of an 8 bit parallel HEC checking circuit;

FIG. 6 is a table showing an operation of the 8 bit parallel HEC checking circuit;

FIG. 7 is a diagram showing a structure of a 16 bit parallel HEC checking circuit;

FIG. 8 is a table showing an operation of the 16 bit parallel HEC checking circuit when the first byte of a header is in the 8 more significant bits of a 16 bit data input bus;

FIG. 9 is a table showing the operation of the 16 bit parallel HEC checking circuit when the first byte of the header is the 8 less significant bits of the 16 bit data input bus;

FIG. 11 is a table showing an operation of a 16 bit parallel HEC checking circuit shown in FIG. 10 when the first byte of a header is in the 8 less significant bits of a data input bus;

FIG. 13 is a diagram showing a structure of a 1 byte delay circuit shown in FIG. 12.

DETAILED DESCRIPTION OF PREFERRED EMBODIMENTS

The present invention will be explained below with reference to the drawings.

Figure 1:
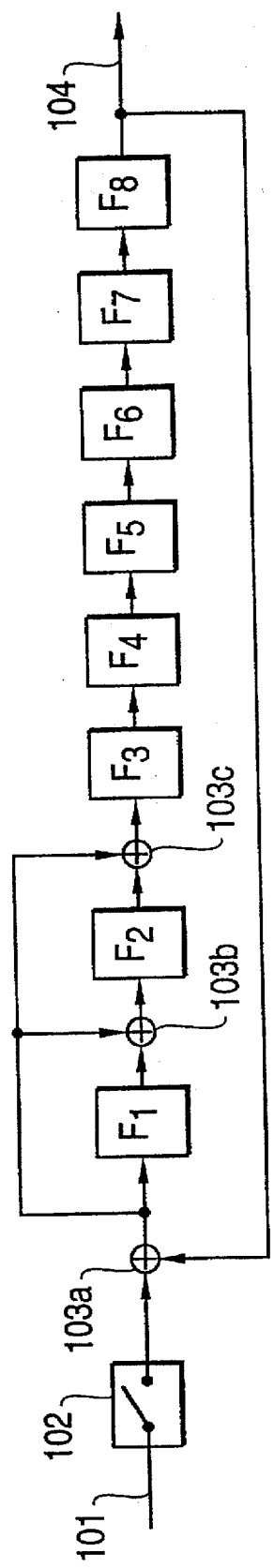
FIG. 1 is a diagram showing a structure of a division circuit which can be used as a serial HEC generating circuit.
Figure 2:
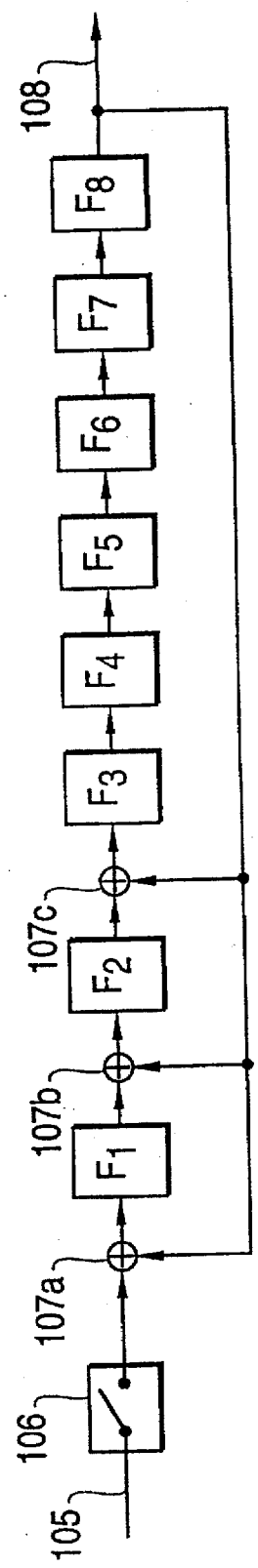
FIG. 2 is a diagram showing a structure of a division circuit which can be used as a serial HEC checking circuit.
Figure 4:
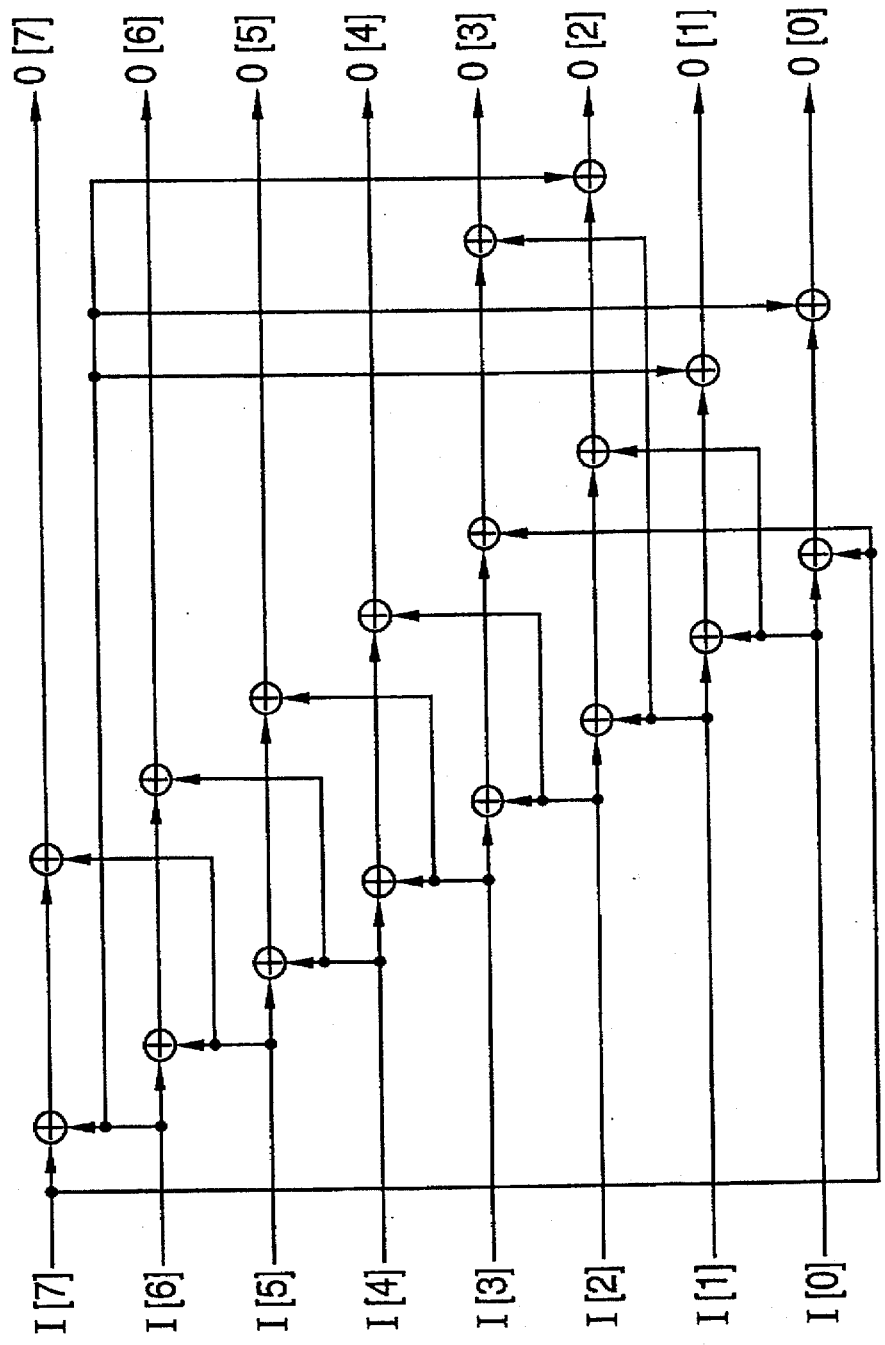
FIG. 4 is a diagram showing a structure of a division pattern generating circuit of an 8 bit parallel input.
Figure 10:
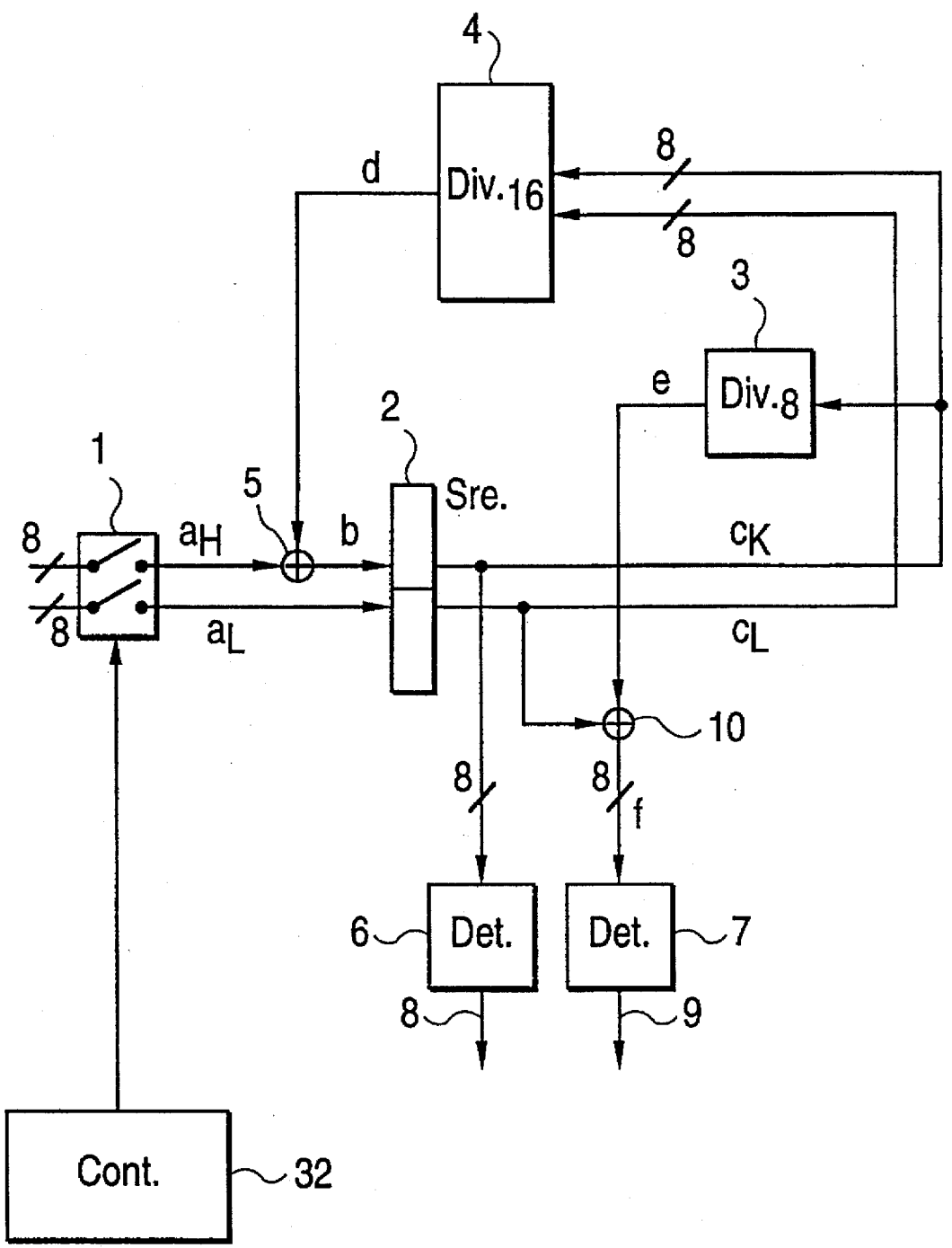
FIG. 10 is a diagram showing a structure of a decoder of an error correcting code according to one embodiment of the present invention.

FIG. 10 shows a structure of a decoder of an error correcting code according to one embodiment of the present invention. The embodiment shown in FIG. 10 is a 16 bit HEC checking circuit. In the figure, a switch 1, controlled by a control circuit 32, turns inputs to a signal line $a_H$ and a signal line $a_L$ ON and OFF separately. A 16 bit parallel shift register 2 has an 8 more significant bit portion register and an 8 less significant bit portion register and functions for delaying stored data one cycle. An 8 bit parallel input division pattern generating circuit 3 functions according to Expression (1) described before. A 16 bit parallel input division pattern generating circuit 4 functions according to Expression (2) described before. An exclusive OR gate 5 outputs an exclusive OR of the data on the signal line $a_H$ and data on a signal line d to a signal line b. A detecting circuit 6 and a detecting circuit 7 detect whether an error is in the header of the received data or not and detect the header position in the series of the received data. The detecting circuit 6 outputs a high level signal to a signal line 8 when (00000000) is output to a signal line $c_H$, and the detecting circuit 7 outputs a high level signal to a signal line 9 when (00000000) is output to a signal line f, respectively, to inform that the header has been received without error. An exclusive OR gate 10 outputs an exclusive OR of the data on a signal line $c_L$ and data on a signal line e to the signal line f.

An operation of the 16 bit HEC checking circuit of the present embodiment will be explained below.

The operation thereof when the first byte of the header exists in the 8 more significant bits of the input bus is similar to the 16 bit HEC checking circuit shown in FIG. 8. In this case, a remainder (H1, H2, H3, H4, H5)modG(X) is output from the signal line $c_H$ in the fourth cycle from the start of the input of the header. If there is no error in the header and the output remainder is (00000000), the header detecting circuit 6 sends out a signal indicating that the header has been received without error via the signal line 8.

Next, the operation thereof when the first byte of the header exists in the 8 less significant bits of the data input bus will be explained with reference to FIG. 11.

FIG. 11 is a table showing changes of data on each signal line of the 16 bit HEC checking circuit of the present embodiment of the decoder per cycle. The operation thereof from the first cycle to the third cycle, is similar to that shown in FIG. 9. That is, five bytes of the header are input from the first cycle to the third cycle and a remainder (H1, H2, H3, H4)modG(X) given when the data from the first byte to the fourth byte of the header is divided by G(X) is output to the signal line b and stored in the 8 more significant bits of the shift register 2 in the third cycle. This remainder, stored in the 8 more significant bits of the shift register, is output to the signal line $c_H$ in the fourth cycle.

The operation thereof from this point is different from that of the 16 bit HEC checking circuit shown in FIG. 9.

The remainder (H1, H2, H3, H4)modG(X) output to the signal line $c_H$ is input to the 8 bit parallel input division pattern generating circuit 3, and an output thereof is output to the signal line e. An exclusive OR 10 receives the data on signal line e and the fifth byte (H5) of the header output on the signal line $c_L$.

In the 16 bit HEC checking circuit of the present embodiment, the remainder (H1, H2, H3, H4)modG(X) output from the signal line $c_H$ in the fourth cycle is input to the 8 bit input division pattern generating circuit 3 and the remainder (H1, H2, H3, H4, H5)modG(X) is output to the signal line f by taking an exclusive OR of that output (data on the signal line e) and the fifth byte (H5) of the header output from the signal line $c_L$. This remainder is input to the header detecting circuit 7 and if there is no error in the header, the header detecting circuit 7 sends out a signal indicating that the header has been detected without error to the signal line 9.

Thus, the 16 bit HEC checking circuit of the present embodiment can perform the HEC check reliably even when the first byte of the header exists in the 8 less significant bits of the data input bus, differing from the 16 bit HEC checking circuit shown in FIG. 7.

Figure 12:
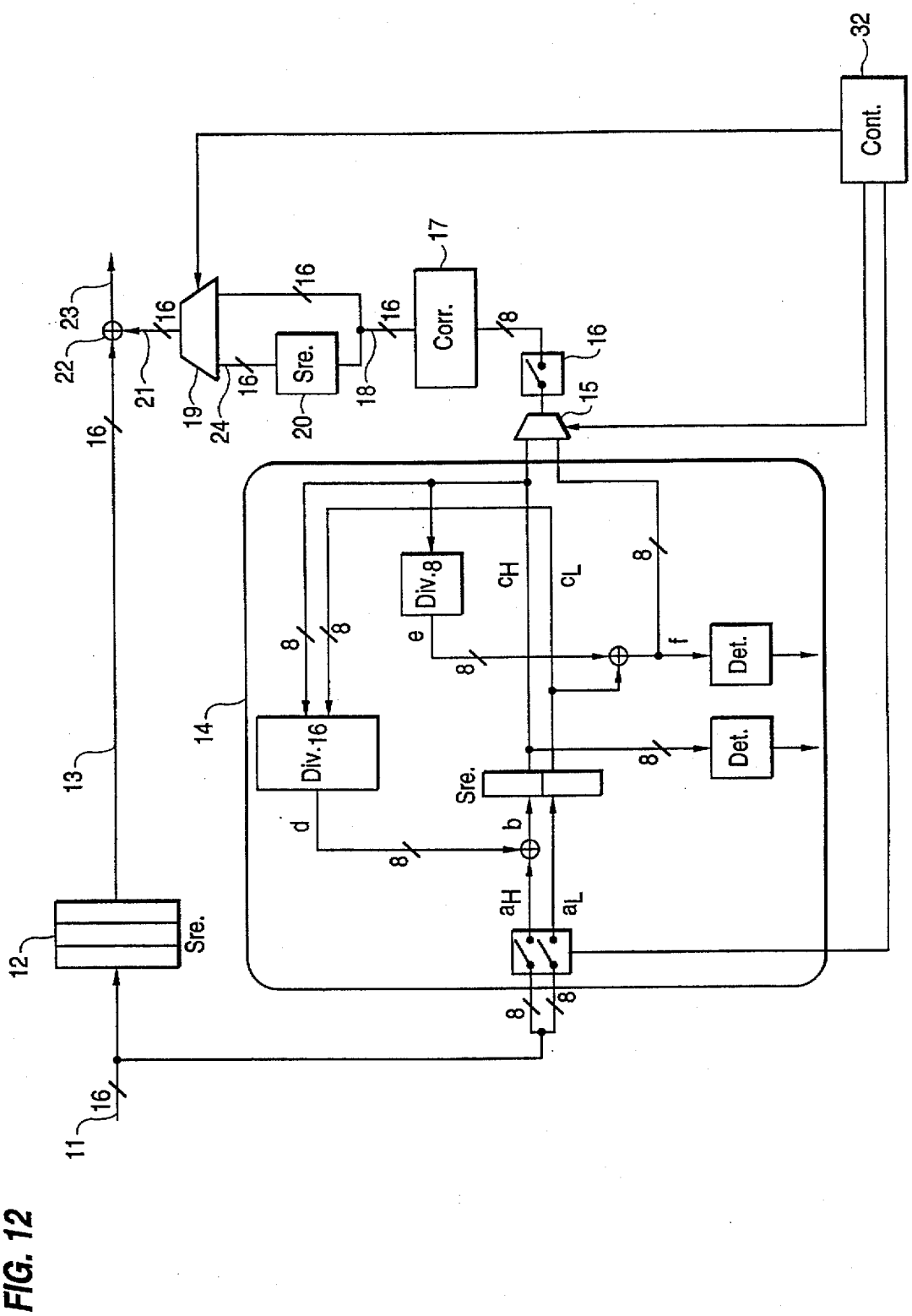
FIG. 12 is a diagram showing a structure of a circuit in which the 16 bit parallel HEC checking circuit shown in FIG. 10 is combined with a 1 bit error correcting circuit.

FIG. 12 is a diagram showing a structure of a decoder of an error correcting code according to another embodiment of the present invention.

The embodiment shown in FIG. 12 is a 16 bit HEC checking circuit which corrects a one bit error. This circuit is constructed by combining a one bit error correcting circuit with the 16 bit HEC checking circuit of the embodiment shown in FIG. 10. This circuit can correct a one bit error in the header irregardless of whether the first byte exists in the 8 more significant bits or in the 8 less significant bits of the data input bus.

In the figure, a signal line 11 is a 16 bit data input bus. The data input bus 11 is divided into two parts: one part is input to a 16 bit parallel three step shift register 12 whose output is connected to a data bus 13; and the other part is input to a part 14, shown in FIG. 12, which is the 16 bit HEC checking circuit of the embodiment shown in FIG. 10.

A selector 15, controlled by control circuit 32, selects an output from either a signal line $c_H$ or a signal line f in the 16 bit HEC checking circuit 14 and outputs it to a switch 16. An output from the switch 16 is input to an error correcting pattern generating circuit 17. After receiving an 8 bit input which is the syndrome, the error correcting pattern generating circuit 17 outputs a 16 bit output to a data bus 18. The data bus 18 is divided into two parts: one part thereof is input to a selector 19 and the other part thereof is input to a one byte delaying circuit 20 whose output is connected to the selector 19.

The one byte delaying circuit 20 is constructed using an 8 bit parallel one step shift register 25 as shown in FIG. 13 for example. In FIG. 13, the register 25 stores the inputted 8 less significant bits of the data and delays that data one cycle. That is, the one byte delaying circuit 20 outputs the stored 8 less significant bits of the data one cycle before as 8 more significant bits of the output data and inputs 8 more significant bits of the data as 8 less significant bits of the output data.

The selector 19, which is controlled by control circuit 32, selects an output from either the error correcting pattern generating circuit 17 or the one byte delaying circuit 20 and outputs it to a signal line 21. The signal line 13 and the signal line 21 are input to an exclusive OR gate 22 whose output is connected to a signal line 23.

The known error correcting pattern generating circuit 17, checks a syndrome of the received data and generates a data pattern for correcting one bit error. If input bit lines are I[i] (i=0 to 7, i=7 corresponds to MSB) and output bit lines are O[i] (i=0 to 15, i=15 corresponds to MSB), the relation between I[i] and O[i] is given by the following expression:

$$O[15]=(I[5]\cdot I[4]\cdot I[0])\cdot(\overline{I[7]}\cdot\overline{I[6]}\cdot\overline{I[3]}\cdot\overline{I[2]}\cdot\overline{I[1]}),$$

$$O[14]=(I[7]\cdot I[4]\cdot I[3]\cdot I[1]\cdot I[0])\cdot(\overline{I[6]}\cdot\overline{I[5]}\cdot\overline{I[2]}),$$

$$O[13]=(I[7]\cdot I[6]\cdot I[3]\cdot I[2]\cdot I[1])\cdot(\overline{I[5]}\cdot\overline{I[4]}\cdot\overline{I[0]}),$$

$$O[12]=(I[6]\cdot I[5]\cdot I[2]\cdot I[1]\cdot I[0])\cdot(\overline{I[7]}\cdot\overline{I[4]}\cdot\overline{I[3]}),$$

$$O[11]=(I[7]\cdot I[5]\cdot I[4])\cdot(\overline{I[6]}\cdot\overline{I[3]}\cdot\overline{I[2]}\cdot\overline{I[1]}\cdot\overline{I[0]}),$$

$$O[10]=(I[6]\cdot I[4]\cdot I[3])\cdot(\overline{I[7]}\cdot\overline{I[5]}\cdot\overline{I[2]}\cdot\overline{I[1]}\cdot\overline{I[0]}),$$

$$O[9]=(I[5]\cdot I[3]\cdot I[2])\cdot(\overline{I[7]}\cdot\overline{I[6]}\cdot\overline{I[4]}\cdot\overline{I[1]}\cdot\overline{I[0]}),$$

$$O[8]=(I[4]\cdot I[2]\cdot I[1])\cdot(\overline{I[7]}\cdot\overline{I[6]}\cdot\overline{I[5]}\cdot\overline{I[3]}\cdot\overline{I[0]}),$$

$$O[7]=(I[3]\cdot I[1]\cdot I[0])\cdot(\overline{I[7]}\cdot\overline{I[6]}\cdot\overline{I[5]}\cdot\overline{I[4]}\cdot\overline{I[2]}),$$

$$O[6]=(I[7]\cdot I[2]\cdot I[1])\cdot(\overline{I[6]}\cdot\overline{I[5]}\cdot\overline{I[4]}\cdot\overline{I[3]}\cdot\overline{I[0]}),$$

$$O[5]=(I[6]\cdot I[1]\cdot I[0])\cdot(\overline{I[7]}\cdot\overline{I[5]}\cdot\overline{I[4]}\cdot\overline{I[3]}\cdot\overline{I[2]}),$$

$$O[4]=(I[7]\cdot I[5]\cdot[1])\cdot(\overline{I[6]}\cdot\overline{I[4]}\cdot\overline{I[3]}\cdot\overline{I[2]}\cdot\overline{I[0]}),$$

$$O[3]=(I[6]\cdot I[4]\cdot I[0])\cdot(\overline{I[7]}\cdot\overline{I[5]}\cdot\overline{I[3]}\cdot\overline{I[2]}\cdot\overline{I[1]}),$$

$$O[2]=(I[7]\cdot I[5]\cdot I[3])\cdot I[1]\cdot I[0])\cdot(\overline{I[6]}\cdot\overline{I[4]}\cdot\overline{I[2]}),$$

$$O[1]=(I[7]\cdot I[6]\cdot I[4])\cdot(I[2]\cdot I[1])\cdot(\overline{I[5]}\cdot\overline{I[3]}\cdot\overline{I[0]}),$$

$$O[0]=(I[6]\cdot I[5]\cdot I[3])\cdot(I[1]\cdot I[0])\cdot(\overline{I[7]}\cdot\overline{I[4]}\cdot\overline{I[2]}). \quad (3)$$

"$\overline{I[i]}$" represents that a signal having a bit number I[i] is reversed, and "·" denotes a logical product. The function of Expression (3) may be simply turned into a circuit by using AND gates and NOR gates.

Then, the operation of this circuit will be explained.

The operation performed when the first byte of the header exists in the 8 more significant bits of the data input bus will be explained first. In this case, the selector 15, controlled by control circuit 32, selects the signal line $c_H$, and the selector 19 selects the signal line 18. Further, the switch 16, controlled by control circuit 32, turns OFF from the first cycle to the third cycle and turns ON from the fourth cycle to the sixth cycle, considering the time when the first and second bytes of the header are input to the signal line 11 as the first cycle.

When the data from the first byte of the header to the first byte of the payload is input from the signal line 11 from the first cycle to the third cycle, the 16 bit HEC checking circuit 14 performs the operation shown in FIG. 8. A syndrome pattern, given when the five byte header is divided by the generator polynomial G(X), is output from the signal line $c_H$. This output data is input to the error correcting pattern generating circuit 17 via the switch 16.

The theory of cyclic code shows that when there is a one bit error in the header, each different syndrome may be obtained corresponding to 40 types (5 bytes=40 bits) of positions of error bits. When the syndrome pattern is input to the error correcting pattern generating circuit 17 in the fourth cycle, the error correcting pattern generating circuit 17 decodes it. Then, when there is an error in any one bit in 16 bits from the first byte to the second byte of the header, the error correcting pattern generating circuit 17 outputs a high level signal to the position of the bit line where the error occurred and outputs a low level signal to the remaining bit lines to the signal line 18. This error correcting pattern is output to the signal line 21 via the selector 19.

Meanwhile, at this time (in the fourth cycle), the first and second bytes of the header are output from the third step of the shift register 12 to the signal line 13. The error bit is corrected by taking an exclusive OR of the error correcting pattern output from the signal line 21 with respect to that data.

When there is no error in the first and second bytes and there is an error in any one bit in 16 bits of the third and fourth bytes, the error correcting pattern generating circuit 17 outputs a high level signal to the position of the bit line where the error occurred and outputs a low level signal to the remaining bit lines to the signal line 18 by decoding the data output from the signal line cH in the fifth cycle. This error correcting pattern is output to the signal line 21 via the selector 19.

At this time (in the fifth cycle), the third and fourth bytes of the header are output from the third step of the shift register 12 to the signal line 13. The error bit is corrected by taking an exclusive OR of the error correcting pattern output from the signal line 21 with respect to this data.

When there is no error in the first through fourth bytes and there is an error in any one bit in the fifth byte, the error is corrected by performing the same operation in the sixth cycle.

Next, the operation performed when the first byte of the header exists in the 8 less significant bits of the data input bus will be explained.

In this case, the selector 15, controlled by control circuit 32, selects the signal line f, and the selector 19 selects a signal line 24. Further, when the 53rd byte of the data (the 48th byte of the payload) and the first byte of the header have been input as the first cycle, the switch 16, controlled by control circuit 32, turns OFF from the first cycle to the third cycle and turns ON from the fourth cycle to the sixth cycle.

When the data from the 48th byte of the payload to the fifth byte of the header is input from the signal line 11, from the first cycle to the third cycle, the 16 bit HEC checking circuit 14 performs the operation shown in FIG. 11, and a syndrome pattern, given when the five byte header is divided by the generator polynomial G(X), is output from the signal line f in the fourth cycle. This output data is input to the error correcting pattern generating circuit 17 via the selector 15 and the switch 16.

When the syndrome pattern has been input in the fourth cycle, the error correcting pattern generating circuit 17 decodes it. When there is an error in any one bit of the 16 bits from the first byte to the second byte of the header, the error correcting pattern generating circuit 17 outputs a high level signal to the position of the bit line where the error occurred and outputs a low level signal to the remaining bit lines to the signal line 18. This error correcting pattern is output to the signal line 21 via the one byte delaying circuit 20 and the selector 19.

By passing through the one byte delaying circuit 20, only the 8 more significant bits of the 16 bit error correcting pattern (error correcting pattern for the first byte of the header) output from the signal line 18 are output to the 8 less significant bits of the signal line 24 in the fourth cycle. The 8 less significant bits of the error correcting pattern (error correcting pattern for the second byte of the header) are output to the 8 significant bits of the signal line 24 in the fifth cycle.

Meanwhile, the 48th byte of the payload and the first byte of the header are output from the third step of the shift register 12 to the signal line 13 at this time (in the fourth cycle). The error bit is corrected by taking an exclusive OR of the error correcting pattern output from the signal line 21 with respect to this data.

When there is no error in the first byte and there is an error in any one bit of the 16 bits in the second and third bytes, the error correcting pattern generating circuit 17 outputs a high level signal to the position of the bit line where the error occurred and outputs a low level signal to the remaining bit lines to the signal line 18 by decoding the data output from the signal line f in the fifth cycle. This error correcting pattern is output to the signal line 21 via the one byte delaying circuit 20 and the selector 19.

At this time (in the fifth cycle), the second and third bytes of the header are output from the third step of the shift register 12 to the signal line 13. The error bit is corrected by taking an exclusive OR of the error correcting pattern from the signal line 21 with respect to this data.

When there is no error from the first through third bytes and there is an error in any one bit in 16 bits in the fourth and fifth bytes, the same operation is carried out in the sixth cycle, thereby correcting the error.

As described above, not only the HEC check but also the one bit error correction of the header can be accomplished irregardless of whether the first byte of the header is the 8 more significant bits or the 8 less significant bits of the data input bus.

Figure 14:
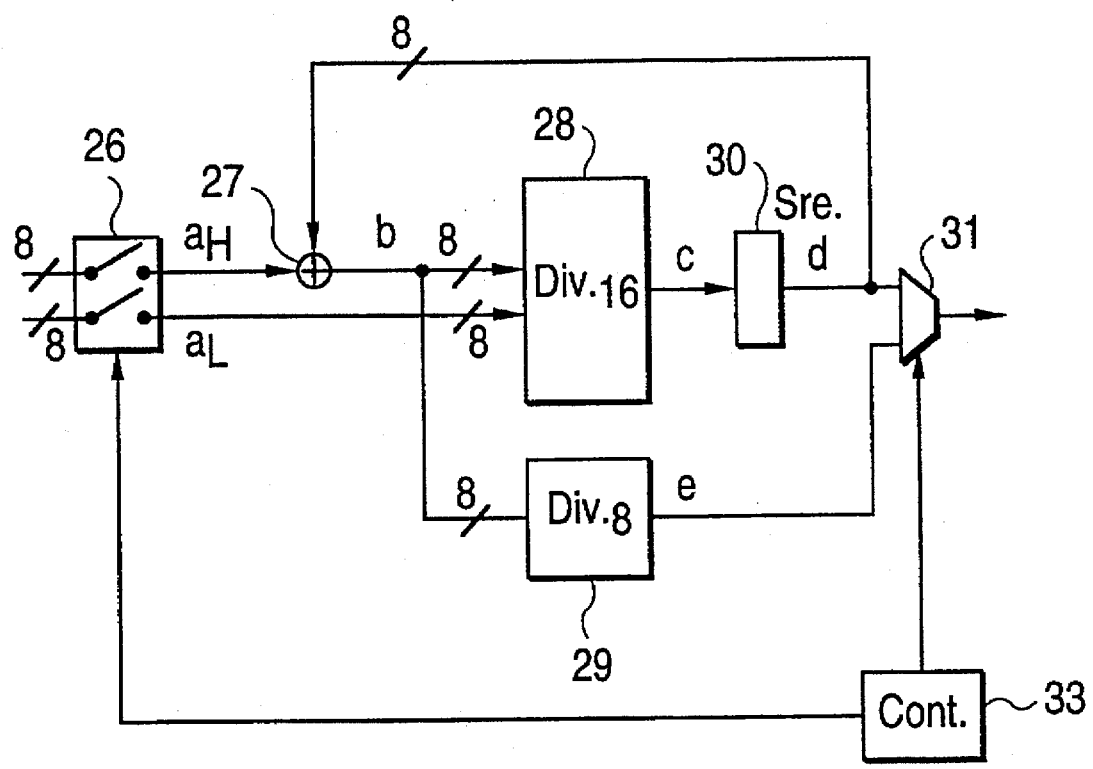
FIG. 14 is a diagram showing a structure of an encoder of an error correcting code according to another embodiment of the present invention.

FIG. 14 is a diagram showing a structure of an encoder of error correcting codes according to another embodiment of the present invention.

The embodiment shown in FIG. 14 is a 16 bit parallel HEC generating circuit (this circuit will be referred to as a 16 bit HEC generating circuit hereinafter).

In the figure, a switch 26, controlled by a control circuit 33, turns the inputs to a signal line $a_H$ and a signal line $a_L$ ON and OFF. An exclusive OR gate 27 outputs an exclusive OR of data on the signal line $a_H$ and data on a signal line d to a signal line b. A 16 bit parallel input division pattern generating circuit 28 outputs an 8 bit division pattern to a signal line c, and an 8 bit parallel input division pattern generating circuit 29 outputs an 8 bit division pattern to a signal line e. An 8 bit parallel one step shift register 30 stores the 8 bit data from the signal line c and outputs the stored data to a signal line d in the next cycle. A selector 31, controlled by control circuit 33, selects data from the signal line d or the signal line e.

An operation of this 16 bit HEC generating circuit will be explained below.

A case when the first byte of the header exists in the 8 more significant bits of the data input bus will be explained first. In this case, the selector 31 selects the signal line d as an input line. The first byte and the second byte of the header are input to the 16 bit parallel input division pattern generating circuit 28 at the same time from the signal line $a_H$ and the signal line $a_L$ in the first cycle. At this time, a remainder $[X^8(H1, H2)]modG(X)$, given when the input from the first byte to the second byte multiplied by $X^8$ is divided by the generator polynomial G(X), is outputted from the 16 bit parallel input division pattern generating circuit 28 to the signal line c and stored in the 8 bit parallel one step shift register 30.

In the second cycle, the third and fourth bytes of the header are input. At this time, a remainder $[X^8(H1, H2, H3, H4)]modG(X)$, i.e. HEC byte, given when the input from the first byte to the fourth byte multiplied by $X^8$ is divided by the generator polynomial G(X), is outputted from the 16 bit parallel input division pattern generating circuit 28 to the signal line c and stored in the 8 bit parallel one step shift register 30. This HEC byte is output to the signal line d in the third cycle, is output via the selector 31, and is then added to the fifth byte of the header.

Next, a case when the first byte of the header exists in the 8 less significant bits of the data input bus will be explained. In this case, the selector 31 selects the signal line e as an input. The signal line $a_H$ is turned OFF. The first byte of the header is input to the signal line $a_L$ and input into the 16 bit parallel input division pattern generating circuit 28 in the first cycle. At this time, a remainder $[X^8(H1)]modG(X)$, given when the input of the first byte multiplied by $X^8$ is divided by the generator polynomial G(X), is outputted from the 16 bit parallel input division pattern generating circuit 28 to the signal line c and stored in the 8 bit parallel one step shift register 30.

In the second cycle, the second and third bytes of the header are input to the 16 bit parallel input division pattern generating circuit 28 and at this time, a remainder $[X^8(H1, H2 H3)]modG(X)$ given when the input from the first byte to the third byte multiplied by $X^8$ is divided by the generator polynomial G(X) is outputted from the 16 bit parallel input division pattern generating circuit 28 to the signal line c and stored in the 8 bit parallel one step shift register 30. This remainder is output to the signal line d in the third cycle and an exclusive OR thereof with respect to the fourth byte of the header input to the signal line $a_H$ is taken by the exclusive OR gate 27. Data output to the signal line b after taking the exclusive OR is input to the 8 bit input division pattern generating circuit 29, and as its output, a remainder $[X^8(H1, H2\ H3, H4)]\bmod G(X)$, i.e. HEC byte, is output to the signal line e.

As described above, the 16 bit HEC generating circuit of the present embodiment can perform the HEC generation irregardless of whether the first byte of the header exists in the 8 more significant bits or the 8 less significant bits of the input data bus.

The present invention has been explained in detail using three embodiments applicable to ATM communication. Although data to be coded/decoded in ATM communication includes a header having five bytes and the generator polynomial used is $G(X)=X^8+X^2+X+1$, the full scope of the present invention is not so limited. The coding and decoding methods described in the present specification are based on a general cyclic coding theory, and accordingly, the error correcting code encoder and decoder of the present invention can be equally applied to communication systems using data coded by this method and having the aforementioned problem caused by data processing in 2 bytes parallel.

It is noted that the 16 bit parallel HEC checking circuit of the embodiment shown in FIG. 10 may be used as a 16 bit parallel HEC generating circuit. In this case, the header detecting circuits 6 and 7 in FIG. 10 become unnecessary. Its operation as the HEC generating circuit will be as follows.

When the first byte of the header exists in the 8 more significant bits of the data input bus, a remainder (H1, H2, H3, H4, 00000000)modG(X), i.e. HEC, can be obtained from the signal line b in the third cycle, by inputting the header from the first byte to the fourth byte and fifth byte (00000000), as is apparent from FIG. 8. When the first byte of the header exists in the 8 less significant bits of the data input bus, a remainder (H1, H2, H3, H4, 00000000)modG(X), i.e. HEC, can be obtained from the signal line f in the fourth cycle, by inputting the header from the first byte to the fourth byte end fifth byte (00000000), as shown in FIG. 9.

Further, although the 16 bit parallel arrangement has been used as embodiments in the present invention, a person skilled in the art will be able to readily expand it to 2n parallel bits ($n=2^k$ where k is natural number and n corresponds to one word length of the communication data cell). In the preferred embodiment, n=8, and n corresponds to one word length of the ATM communication data cell.

As described above, the decoder and the encoder of a 2n parallel error correcting code of the present invention allow data to be decoded or coded, irregardless of whether the error correcting code of the header input is in the n more significant bits or the n less significant bits of a 2n parallel data bus.

While there has been illustrated and described what are presently considered to be preferred embodiments of the present invention, it will be understood by those skilled in the art that various changes and modifications may be made, and equivalents may be substituted for devices thereof without departing from the true scope of the invention. In addition many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A decoder for decoding communication data, the communication data comprising data words each having n bits (n being a positive integer), the decoder receiving 2n parallel bits, the 2n parallel bits comprising a first n bit word and a second n bit word, the decoder comprising:

a first logic gate for generating a first logic signal;

a second logic gate for generating a second logic signal;

a 2n division pattern circuit for generating a first division pattern; and an n division pattern circuit for generating a second division pattern;

the first logic gate being connected to receive the first n bit word and the first division pattern;

the second logic gate being connected to receive the second n bit word and the second division pattern;

the 2n division pattern circuit being connected to receive the first logic signal and the second n bit word; and the n division pattern circuit being connected to receive the first logic signal.

2. The decoder as claimed in claim 1, wherein a cell of communication data comprises an odd number of words.

3. The decoder as claimed in claim 2, wherein the communication data is ATM data.

4. A decoder as claimed in claim 1, wherein the first and second logic gates are exclusive or gates.

5. A decoder as claimed in claim 4, further comprising:

a first detector circuit for receiving the first logic signal and for determining whether an error exists in the communication data when an error correction code appears in the first n bit word; and a second detector circuit for receiving the second logic signal and for determining whether an error exists in the communication data when an error correction code appears in the second n bit word.

6. A decoder as claimed in claim 5, further comprising a 2n bit shift register for receiving the first logic signal and the second n bit word; for storing the first logic signal as n more significant bits; and for storing the second n bit word as n less significant bits; the 2n bit shift registered connected to output the n more significant bits to the first detector, the n division pattern circuit, and the 2n division pattern circuit; and the 2n bit shift register connected to output the n less significant bits to the second logic gate and the 2n division pattern circuit.

7. The decoder as claimed in claim 6, wherein n equals $2^k$ where k is a positive integer.

8. A decoder as claimed in claim 1, further comprising:

a first selector connected to the first logic gate and the second logic gate for selecting either the first logic signal or the second logic signal;

a correction circuit connected to the first selector for receiving either the first logic signal or the second logic signal and for generating a 2n bit error correction pattern;

a delay circuit connected to the correction circuit for receiving the error correction pattern and for storing at least n bits of the error correction pattern;

a second selector connected to the delay circuit and the correction circuit for selecting a 2n bit error correction pattrn from the delay circuit or the correction circuit;

a third logic gate for receiving the 2n parallel bits and the 2n bit error correction word from the second selector circuit and for generating a corrected 2n parallel bit data.

9. The decoder as claimed in claim 8, wherein a cell of communication data comprises an odd number of words.

10. A decoder as claimed in claim 8, further comprising:
a 2n parallel bit shift register for receiving and delaying the 2n parallel bits, the 2n parallel bit shift register connected to output the 2n parallel bits to the third logic gate at a set timing so that the 2n parallel bits and the corresponding 2n bit error correction pattern reach the third logic gate substantially simultaneously.

11. A decoder as claimed in claim 10, wherein the first, second, and third logic gates are exclusive or gates.

12. A decoder as claimed in claim 8, further comprising:
a 2n parallel bit shift register for receiving and delaying the 2n parallel bits, the 2n parallel bit shift register connected to output the 2n parallel bits to the third logic gate at a set timing so that the 2n parallel bits and the corresponding 2n bit error correction pattern reach the third logic gate substantially simultaneously.

13. A decoder as claimed in claim 12, wherein the first, second, and third logic gates are exclusive or gates.

14. A decoder as claimed in claim 13, further comprising:
a first detector circuit for receiving the first logic signal and for determining whether an error exists in the communication data when an error correcting code appears in the first n bit word;
a second detector circuit for receiving the second logic signal and for determining whether an error exists in the communication data when an error correcting code appears in the second n bit word; and
a switch connected between the first selector and the correction circuit, the switch closing if either the first detector of the second detector determines an error exists.

15. A decoder as claimed in claim 14, further comprising a 2n bit shift register for receiving the first logic signal and the second n bit word; for storing the first logic signal as n more significant bits; and for storing the second n bit word as n less significant bits; the 2n bit shift register connected to output the n more significant bits to the first detector, the n division pattern circuit, and the 2n division pattern circuit; and the 2n bit shift register connected to output the n less significant bits to the second logic gate and the 2n division pattern circuit.

16. The decoder as claimed in claim 15, wherein n equals $2^k$ where k is a positive integer.

17. The decoder as claimed in claim 16, wherein the communication data is ATM data.

18. An encoder for encoding communication data, the communication data comprising data words each having n bits (n being a positive integer), the encoder receiving 2n parallel bits, the 2n parallel bits comprising a first n bit word and a second n bit word, the encoder comprising:
a logic gate for generating a logic signal;
a 2n division pattern circuit for generating a first division pattern;
an n division pattern circuit for generating a second division pattern;
the logic gate being connected to receive the first n bit word and the first division pattern;
the 2n division pattern circuit being connected to receive the logic signal and the second n bit word;
the n division pattern circuit being connected to receive the logic signal; and
a selector connected to the 2n division pattern circuit and the n division pattern circuit for selecting the first division pattern or the second division pattern.

19. The encoder as claimed in claim 18, wherein n equals $2^k$ where k is a positive integer.

20. The encoder as claimed in claim 18, wherein a cell of communication data comprises an odd number of words.

21. The encoder as claimed in claim 20, wherein the communication data is ATM data.

22. A decoder for decoding communication data, the communication data comprising data words each having n bits (n being a positive integer), the decoder receiving 2n parallel bits, the 2n parallel bits comprising a first n bit word and a second n bit word, the decoder comprising:
a first logic gate for generating a first logic signal;
a second logic gate for generating a second logic signal;
a 2n division pattern circuit for generating a first division pattern;
an n division pattern circuit for generating a second division pattern;
the first logic gate being connected to receive the first n bit word and the first division pattern;
the second logic gate being connected to receive the second n bit word and the second division pattern;
the 2n division pattern circuit being connected to receive the first logic signal and the second n bit word;
the n division pattern circuit being connected to receive the first logic signal;
a first detector circuit for receiving the first logic signal and for determining whether an error exists in the communication data when an error correcting code appears in the first n bit word; and
a second detector circuit for receiving the second logic signal and for determining whether an error exists in the communication data when an error correcting code appears in the second n bit word.

23. The decoder as claimed in claim 22, further comprising:
a first selector connected to the first logic gate and the second logic gate for selecting the first logic signal if the first detector circuit determines that an error exists in the communication data when an error correcting code appears in the first n bit word and for selecting the second logic signal if the second detector determines that an error exists in the communication data when an error correcting code appears in the second n bit word;
a correction circuit connected to the first selector for receiving either the first logic signal or the second logic signal and for generating a 2n bit error correction pattern;
a delay circuit connected to the correction circuit for receiving the error correction word and for storing at least n bits of the error correction pattern;
a second selector connected to the delay circuit and the correction circuit for selecting a 2n bit error correction pattern from the delay circuit or the correction circuit;
a third logic gate for receiving the 2n parallel bits and the 2n bit error correction pattern from the second selector circuit and for generating a corrected 2n parallel bit data.

24. The decoder as claimed in claim 22, wherein a cell of communication data comprises an odd number of words.

25. The decoder as claimed in claim 24, wherein the communication data is ATM data.

26. A decoder as claimed in claim 22, wherein the first and second logic gates are exclusive or gates.

27. A decoder as claimed in claim 26, further comprising a 2n bit shift register for receiving the first logic signal and the second n bit word; for storing the first logic signal as n more significant bits; and for storing the second n bit word as n less significant bits; the 2n bit shift registered connected to output the n more significant bits to the first detector, the n division pattern circuit, and the 2n division pattern circuit; and the 2n bit shift register connected to output the n less significant bits to the second logic gate and the 2n division pattern circuit.

28. The decoder as claimed in claim 27, wherein n equals 8.

29. A decoder for decoding communication data that includes an n bit error correcting code, comprising:
   a data input bus for inputting received communication data by 2n bits parallel in each cycle;
   a first switch circuit for passing inputted n bit data which are n more significant bits of the 2n bit data from the data input bus when the n more significant bit data of the 2n bit data from the data input bus are the coded communication data;
   a second switch circuit for passing inputted n bit data which are n less significant bits of the 2n bit data from the data input bus when the n less significant bit data of the 2n bit data from the data input bus are the coded communication data;
   a first gate circuit for taking an exclusive OR of the n bit data from the first switch circuit and an n bit first division pattern;
   a first shift register for storing n bit data from the first gate circuit as n significant bit data and the n bit data from the second switch circuit as n less significant bit data and for outputting the stored 2n bit data in the next cycle;
   a first division pattern generating circuit for generating the n bit first division pattern from the 2n bit data from the first shift register;
   a second division pattern generating circuit for generating an n bit second division pattern from the n significant bit data of the 2n bit data from the first shift register;
   a second gate circuit for taking an exclusive OR of the n less significant bit data of the 2n bit data from the first shift register and the n bit second division pattern;
   a first detecting circuit for detecting that the n significant bit data of the 2n bit data from the first shift register is equal to prescribed data which means that there is no error in the received coded data; and
   a second detecting circuit for detecting that the n bit data from the second gate circuit is equal to the prescribed data which means that there is no error in the received coded data.

30. The decoder according to claim 29, wherein the first detecting circuit can detect that the n significant bit data of the 2n bit data from the first shift register is equal to the prescribed data which means that there is no error in received coded data if the error correcting code is in the n more significant bits of the data input bus.

31. The decoder according to claim 29, wherein the second detecting circuit can detect that the n bit data from the second gate circuit is equal to the prescribed data which means that there is no error in received coded data if the error correcting code is in the n less significant bits of the data input bus.

32. The decoder according to claim 29, wherein the communication data is ATM data.

33. The decoder according to claim 29, wherein the n bits are $2^k$ (where k is a positive integer) bits.

34. The decoder according to claim 29, wherein a cell of the communication data has an odd number of words.

35. The decoder according to claim 29, further comprising:
   a first selector for selecting alternatively n significant bits of the 2n bit data from the first shift register or the n bit data from the second gate circuit;
   a error correcting pattern generating circuit for generating a 2n bit error correcting pattern from the n bit data from the first selector;
   a delay circuit for storing n less significant bit data of the 2n bit error correcting pattern from the error correcting pattern generating circuit and for outputting the stored n bit data as n significant bit data with inputted n significant bit data of the 2n bit error correcting pattern from the error correcting pattern generating circuit as n less significant bit data in the next cycle;
   a second selector for selecting alternatively the 2n bits error correcting pattern from the error correcting pattern generating circuit or the delayed 2n bits error correcting pattern for the delay circuit;
   a second shift register for storing 2n bits data from the data input bus and for outputting the stored 2n bits data; and
   a third gate circuit for taking an exclusive OR with respect to the 2n bit data from the second shift register and the 2n bit error correcting pattern from the second selector and for outputting error corrected header data.

36. The decoder according to claim 35, wherein the first selector selects n significant bits of the 2n bit data from the first shift register if the error correcting code is in the n more significant bits of the data input bus, and selects n bit data from the second gate circuit if the error correcting code is in the n less significant bits of the data input bus.

37. The decoder according to claim 35, wherein the second selector selects the 2n bit error correcting pattern from the error correcting pattern generating circuit if the error correcting code is in the n more significant bits of the data input bus, and selects the delayed 2n bit error correcting pattern from the delay circuit if the error correcting code is in the n less significant bits of the data input bus.

38. The decoder according to claim 35, wherein the communication data is ATM data.

39. The decoder according to claim 35, wherein the n bits are $2^k$ (where k is a positive integer) bits.

40. The decoder according to claim 35, wherein a cell of the communication data has an odd number of words.

41. An encoder for encoding communication data with an n bit error correcting code, comprising:
   a data input bus for inputting the header of the communication data by 2n bits parallel in each cycle;
   a first switch circuit for passing inputted n bit data which are n more significant bits of the 2n bit data from the data input bus when the n more significant bit data of the 2n bit data from the data input bus are the data which is to be coded;
   a second switch circuit for passing inputted n bit data which are n less significant bits of the 2n bit data from the data input bus when the n less significant bit data of the 2n bit data from the data input bus are the data which is to be coded;
   a first gate circuit for taking an exclusive OR with respect to the n bit data from the first switch circuit and an n bit first division pattern;
   a first division pattern generating circuit for generating the n bit first division pattern from the n bit data from the first gate circuit and the n bit data from the second switch circuit;

a shift register for storing the n bit data from the first division pattern generating circuit and for outputting the stored n bit data in the next cycle;

a second division pattern generating circuit for generating an n bit second division Pattern from n bits data from the first gate circuit; and a selector for selecting alternatively the n bit data from the shift register or the n bit data from the second division pattern generating circuit as the error correcting code.

42. The encoder according to claim 41, wherein the selector selects the n bit data from the shift register if the error correcting code is in the n less significant bits of the data input bus.

43. The encoder according to claim 41, wherein the selector selects the n bit data from the second division pattern generating circuit if the error correcting code is in the n more significant bits of the data input bus.

44. The encoder according to claim 41, wherein communication data is ATM data.

45. The encoder according to claim 41, wherein the n bits are $2^k$ (k is natural number) bits.

46. The encoder according to claim 41, wherein a cell of the communication data has an odd number of words.

47. An encoder for encoding communication data with an n bits error correcting code in a header, comprising:

a data input bus for inputting the header of the communication data by 2n bits parallel in each cycle;

a first switch circuit for passing inputted n bit data which are n more significant bits of the 2n bit data from the data input bus when the n more significant bit data of the 2n bit data from the data input bus are the data which is to be coded;

a second switch circuit for passing inputted n bit data which are n less significant bits of the 2n bit data from the data input bus when the n less significant bit data of the 2n bit data from the data input bus are the data which is to be coded;

a first gate circuit for taking an exclusive OR with respect to the n bit data from the first switch circuit and an n bit first division pattern;

a shift register for storing the n bit data from the first gate circuit as n more significant bit data and the n bit data from the second switch circuit as n less significant bit data and for outputting the stored 2n bit data in the next cycle;

a first division pattern generating circuit for generating the n bit first division pattern from the 2n bit data from the shift register;

a second division pattern generating circuit for generating an n bit second division pattern from n more significant bit data of the 2n bit data from the shift register;

a second gate circuit for taking an exclusive OR of the n less significant bit data of the 2n bit data from the shift register and the n bit second division pattern; and a selector for selecting alternatively the n significant bits of the 2n bit data from the shift register or the n bit data from the second gate circuit as the error correcting code.

48. The encoder according to claim 47, wherein the selector selects n bit data from the shift register if the last word of the data to be coded is the n more significant bits of the data input bus.

49. The encoder according to claim 47, wherein the selector selects n bit data from the second division pattern generating circuit if the last word of the data which is to be coded is the n less significant bits of the data input bus.

50. The encoder according to claim 47, wherein the communication data is ATM data.

51. The encoder according to claim 47, wherein the n bits are $2^k$ (k is natural number) bits.

52. The encoder according to claim 47, wherein a cell of the communication data has an odd number of words.

* * * * *

UNITED STATES PATENT AND TRADEMARK OFFICE
CERTIFICATE OF CORRECTION

PATENT NO. : 5,694,405
DATED : December 02, 1997
INVENTOR(S) : Masanori KUWAHARA et al.

It is certified that error appears in the above-indentified patent and that said Letters Patent is hereby corrected as shown below:

Claim 8, Column 16, Line 61, "pattrn" should read --pattern--.

Claim 35, Column 20, Line 6, "a error" should read --an error--.

Claim 41, Column 21, Line 5, "Pattern" should read --pattern--.

Signed and Sealed this

Fourteenth Day of April, 1998

Attest:

BRUCE LEHMAN

*Attesting Officer*      *Commissioner of Patents and Trademarks*